US011404967B2

(12) United States Patent
Fei et al.

(10) Patent No.: US 11,404,967 B2
(45) Date of Patent: *Aug. 2, 2022

(54) INTERLEAVED CONVERTERS WITH INTEGRATED MAGNETICS

(71) Applicant: Virginia Tech Intellectual Properties, Inc., Blacksburg, VA (US)

(72) Inventors: Chao Fei, Blacksburg, VA (US); Bin Li, Blacksburg, VA (US); Fred C. Lee, Blacksburg, VA (US); Qiang Li, Blacksburg, VA (US)

(73) Assignee: VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 514 days.

This patent is subject to a terminal disclaimer.

(21) Appl. No.: 16/006,117

(22) Filed: Jun. 12, 2018

(65) Prior Publication Data

US 2019/0379292 A1    Dec. 12, 2019

(51) Int. Cl.
*H02M 3/335* (2006.01)
*H01F 3/14* (2006.01)
(Continued)

(52) U.S. Cl.
CPC .......... *H02M 3/33592* (2013.01); *H01F 3/14* (2013.01); *H01F 27/24* (2013.01); *H01F 27/2804* (2013.01); *H02M 3/33584* (2013.01)

(58) Field of Classification Search
CPC . H02M 3/33592; H02M 3/33584; H01F 3/14; H01F 27/24; H01F 27/2804
See application file for complete search history.

(56) References Cited

U.S. PATENT DOCUMENTS

| | | | |
|---|---|---|---|
| 9,240,723 B2 | 1/2016 | Boysen et al. | |
| 2004/0257188 A1* | 12/2004 | Younger | H01F 30/12 336/180 |

(Continued)

FOREIGN PATENT DOCUMENTS

CN        102790533        11/2012

OTHER PUBLICATIONS

"Super Efficiency Rectifier Module", Huawei Technologies Co., Ltd. (2014). www.huawei.com.

(Continued)

*Primary Examiner* — Thienvu V Tran
*Assistant Examiner* — Bart Iliya
(74) *Attorney, Agent, or Firm* — Thomas | Horstemeyer, LLP

(57) ABSTRACT

Three-phase interleaved LLC and CLLC resonant converters, with integrated magnetics, are described. In various examples, the primary sides of the phases in the converters rely upon a half-bridge configuration and include resonant networks coupled to each other in delta-connected or common Y-node configurations. The secondary sides of the phases can rely upon a full-bridge configurations and are coupled in parallel. In one example, the transformers of the phases in the converters are integrated into one magnetic core. By changing the interleaving structure between the primary and secondary windings in the transformers, resonant inductors of the phases can also be integrated into the same magnetic core. A multi-layer PCB can be used as the windings for the integrated magnetics.

20 Claims, 15 Drawing Sheets

(51) Int. Cl.
*H01F 27/24* (2006.01)
*H01F 27/28* (2006.01)

(56) References Cited

U.S. PATENT DOCUMENTS

| | | | | |
|---|---|---|---|---|
| 2006/0214866 | A1* | 9/2006 | Araki | G04G 21/04 |
| | | | | 343/788 |
| 2006/0268589 | A1* | 11/2006 | Nakahori | H02M 3/285 |
| | | | | 363/132 |
| 2009/0046486 | A1* | 2/2009 | Lu | H02M 3/285 |
| | | | | 363/45 |
| 2012/0262953 | A1* | 10/2012 | Jungreis | H02M 3/285 |
| | | | | 363/17 |
| 2013/0201725 | A1* | 8/2013 | Boysen | H02M 3/3376 |
| | | | | 363/15 |
| 2013/0343091 | A1* | 12/2013 | Njiende T. | H01F 30/06 |
| | | | | 363/16 |
| 2015/0349649 | A1* | 12/2015 | Zane | H02M 3/33507 |
| | | | | 363/21.03 |
| 2016/0016479 | A1* | 1/2016 | Khaligh | B60L 11/1812 |
| | | | | 363/17 |
| 2016/0254756 | A1 | 9/2016 | Yang et al. | |
| 2017/0047155 | A1* | 2/2017 | Yao | H01F 27/24 |
| 2017/0155332 | A1* | 6/2017 | Sigamani | H01F 38/00 |
| 2017/0326992 | A1* | 11/2017 | Budhia | B60L 5/005 |
| 2017/0330678 | A1* | 11/2017 | Harrison | H01F 27/2804 |

OTHER PUBLICATIONS

Ho-Sung Kim; et al "The high-efficiency isolated ac-dc converter using the three-phase interleaved LLC resonant converter employing the Y-connected rectifier." IEEE Trans. on Power Electron. vol. 29, No. 8, pp. 4017-4028, Aug. 2014.

Enrico Orietti; et al. "Current sharing in three-phase LLC interleaved resonant converter." Proc. IEEE ECCE 2009, pp. 1145-1152.

* cited by examiner

INTERLEAVED CONVERTERS WITH INTEGRATED MAGNETICS

BACKGROUND

Power conversion is related to the conversion of electric power or energy from one form to another. Power conversion can involve converting between alternating current (AC) and direct current (DC) forms of energy, AC to AC forms, DC to DC forms, changing the voltage, current, or frequency of energy, or changing some other aspect of energy from one form to another. In that context, a power converter is an electrical or electro-mechanical device for converting electrical energy. A transformer is one example of a power converter, although more complicated systems, including complex arrangements of diodes, synchronous rectifiers, switching transistors, transformers, and control loops, can be used.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

As noted above, power conversion is related to the conversion of electric power or energy from one form to another. Power conversion can involve converting between alternating current (AC) and direct current (DC) forms of energy, AC to AC forms, DC to DC forms, changing the voltage, current, or frequency of energy, or changing some other aspect of energy from one form to another. In that context, a power converter is an electrical or electro-mechanical device for converting electrical energy. A transformer is one example of a power converter, although more complicated systems, including complex arrangements of diodes, synchronous rectifiers, switching transistors, transformers, and control loops, can be used.

In the context of power converters, new types of three-phase interleaved LLC and CLLC resonant converters, with integrated magnetics, are described herein. In various examples, the primary sides of the phases in the converters rely upon a half-bridge configuration and include resonant networks coupled to each other in delta-connected or common Y-node configurations. The secondary sides of the phases can rely upon a full-bridge configurations and are coupled in parallel.

In other aspects, the transformers of the three phases in the converters are integrated into one magnetic core. By changing the interleaving structure between the primary and secondary windings in the transformers, resonant inductors of the phases can also be integrated into the same magnetic core. A multi-layer PCB can be used as the windings for the integrated magnetics described herein.

Figure 1:
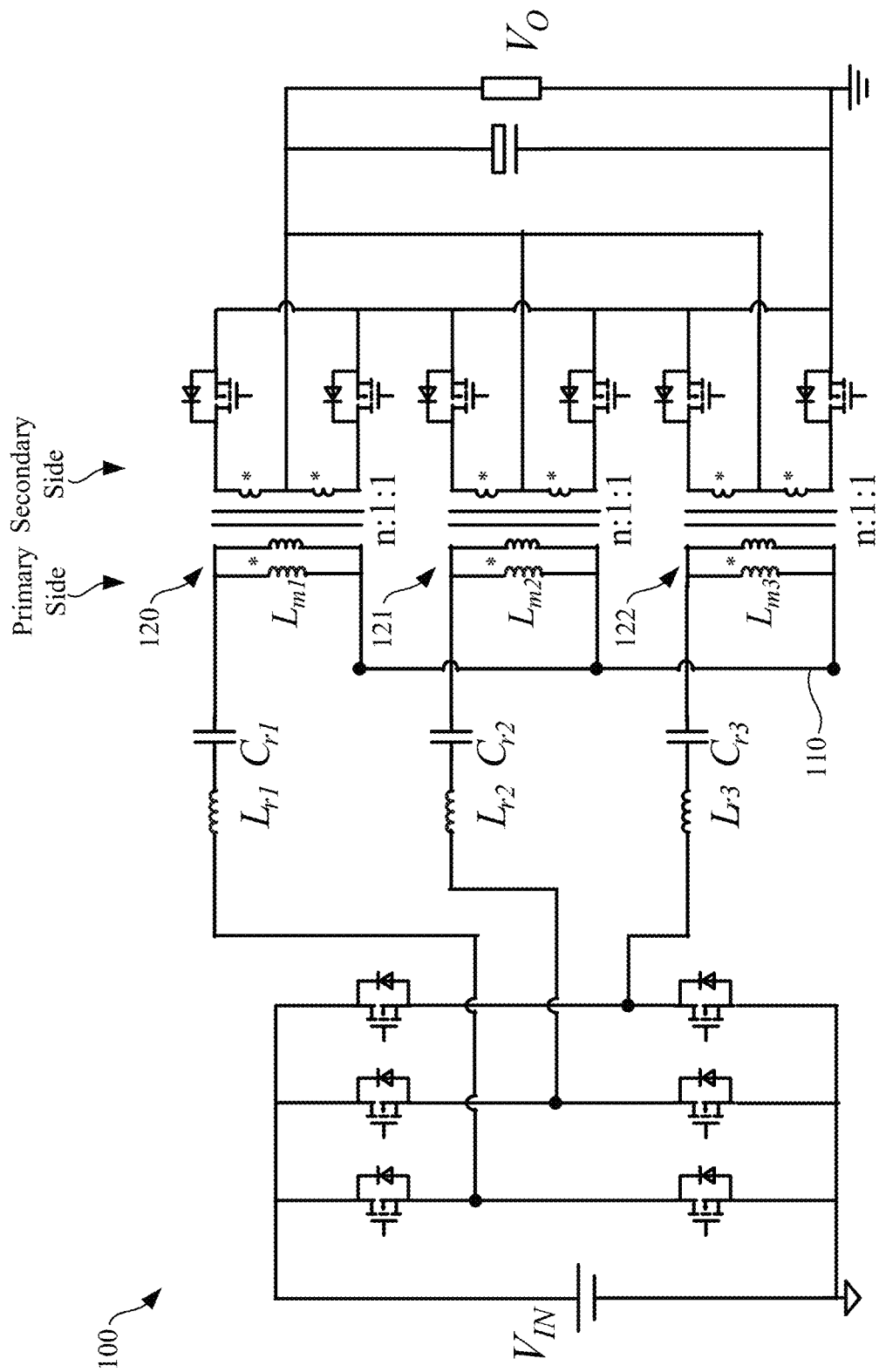
FIG. 1 illustrates a three-phase interleaved LLC converter with a common Y-node at the primary side according to various embodiments described herein.

A number of representative converters are shown in FIGS. 1-4. To start, FIG. 1 illustrates a three-phase interleaved LLC converter 100 with a common Y-node 110 at the primary side according to various embodiments described herein. The converter 100 in FIG. 1 is provided as a representative example. Other power converters are shown in FIGS. 2-4, 5A-5B, and 8A-8B. While the converter 100 includes three interleaved phases, additional (or fewer) phases can be interleaved in other examples.

A typical LLC converter can have relatively large input and output ripple currents. An interleaved LLC converter, such as the converter 100, is designed to reduce such ripple currents. By coupling a number of different phases of an LLC converter through a common node or network (e.g., the common Y-node 110 shown in FIG. 1), the different phases of the interleaved LLC converter can achieve current sharing by simply interleaving the primary driving signals between the different phases.

As shown in FIG. 1, the converter 100 includes transformers 120-122, respectively, for the three phases of the converter 100. Each of the transformers 120-122 includes a primary and a secondary side. Through the common primary Y-node 110, the three primary phase legs on the primary side of the power converter 100 are coupled together. This coupling at the common primary Y-node 110 achieves interleaving and current sharing among the three phases of the converter 100. The input to output ratio of the converter 100 at resonant frequency is:

$$\frac{V_O}{V_{IN}} = \frac{1}{2n}$$

Figure 2:
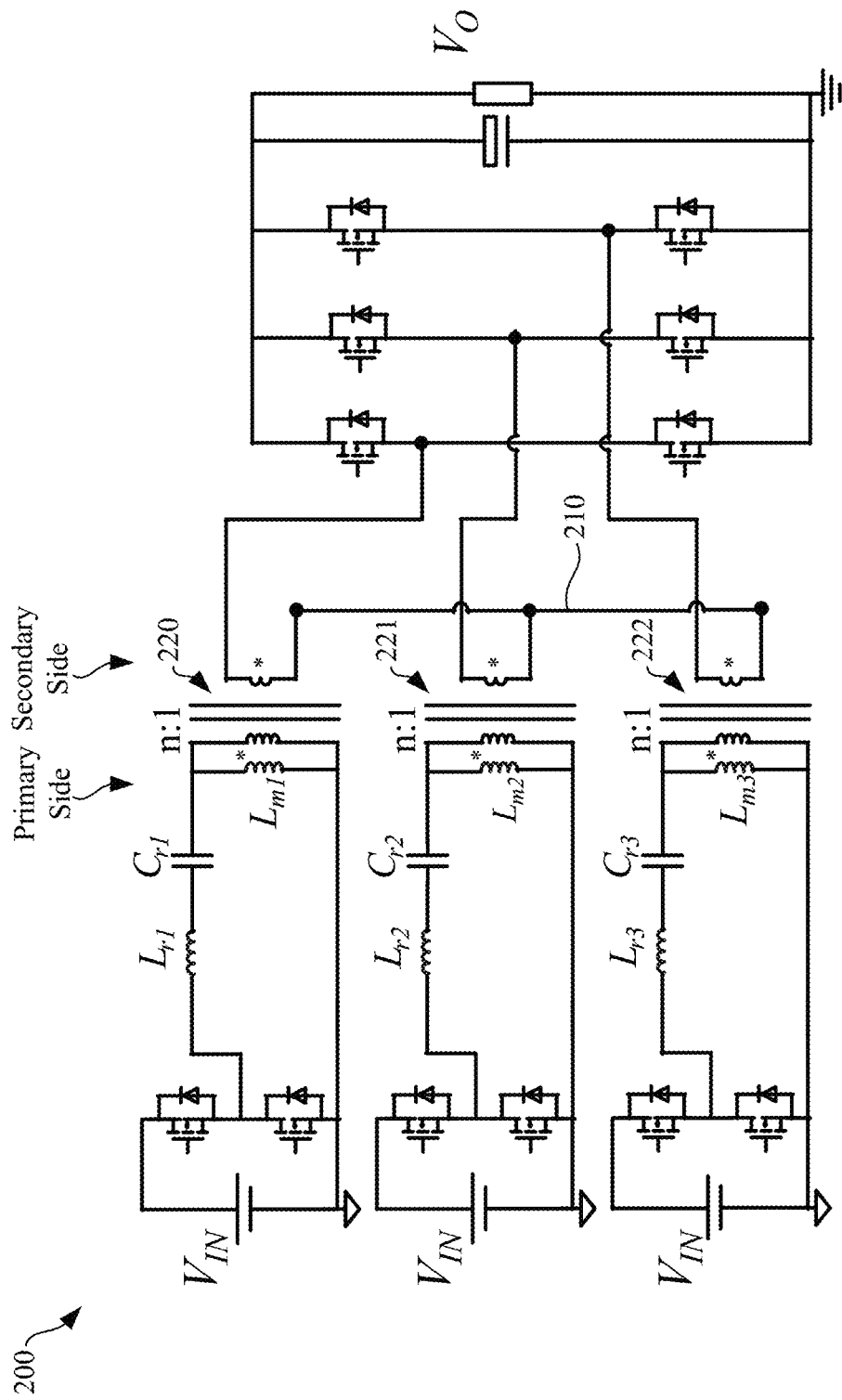
FIG. 2 illustrates a three-phase interleaved LLC converter with a common Y-node at the secondary side according to various embodiments described herein.

FIG. 2 illustrates a three-phase interleaved LLC converter 200 with a common Y-node 210 at the secondary side according to various embodiments described herein. As shown in FIG. 2, the converter 200 includes transformers 220-222, respectively, for the three phases of the converter 200. Each of the transformers 220-222 includes a primary and a secondary side. Through the common secondary Y-node 210, the three secondary phase legs on the secondary side of the power converter 200 are coupled together. When using the common secondary Y-node 210, the secondary side is in a half-bridge configuration and behaves similar to a voltage doubler. The input to output ratio of the converter 100 at resonant frequency is:

$$\frac{V_O}{V_{IN}} = \frac{1}{n}$$

Figure 3:
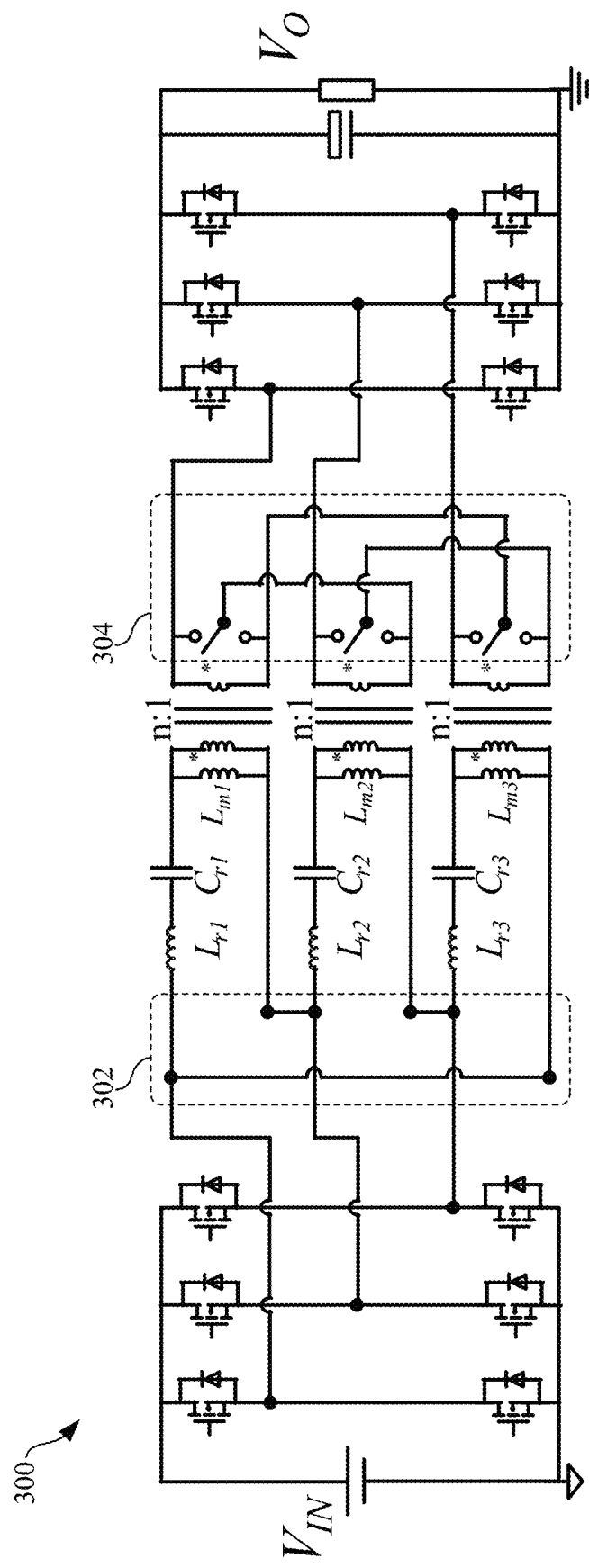
FIG. 3 illustrates a three-phase interleaved LLC converter with a delta-connected tank at the primary and a configurable secondary side according to various embodiments described herein.

FIG. 3 illustrates a three-phase interleaved LLC converter 300 with a delta-connected tank 302 at the primary and a configurable secondary side 304 according to various embodiments described herein. In the delta-connected tank 302, the resonant tanks of the transformers are coupled in a delta-connection. The primary switching nodes of the three phases of the converter 300 are connected to the three nodes of the delta-connected primary tank 302, respectively. The configurable secondary side 304 can be configured into a delta-connection or a Y-connection.

Figure 4:
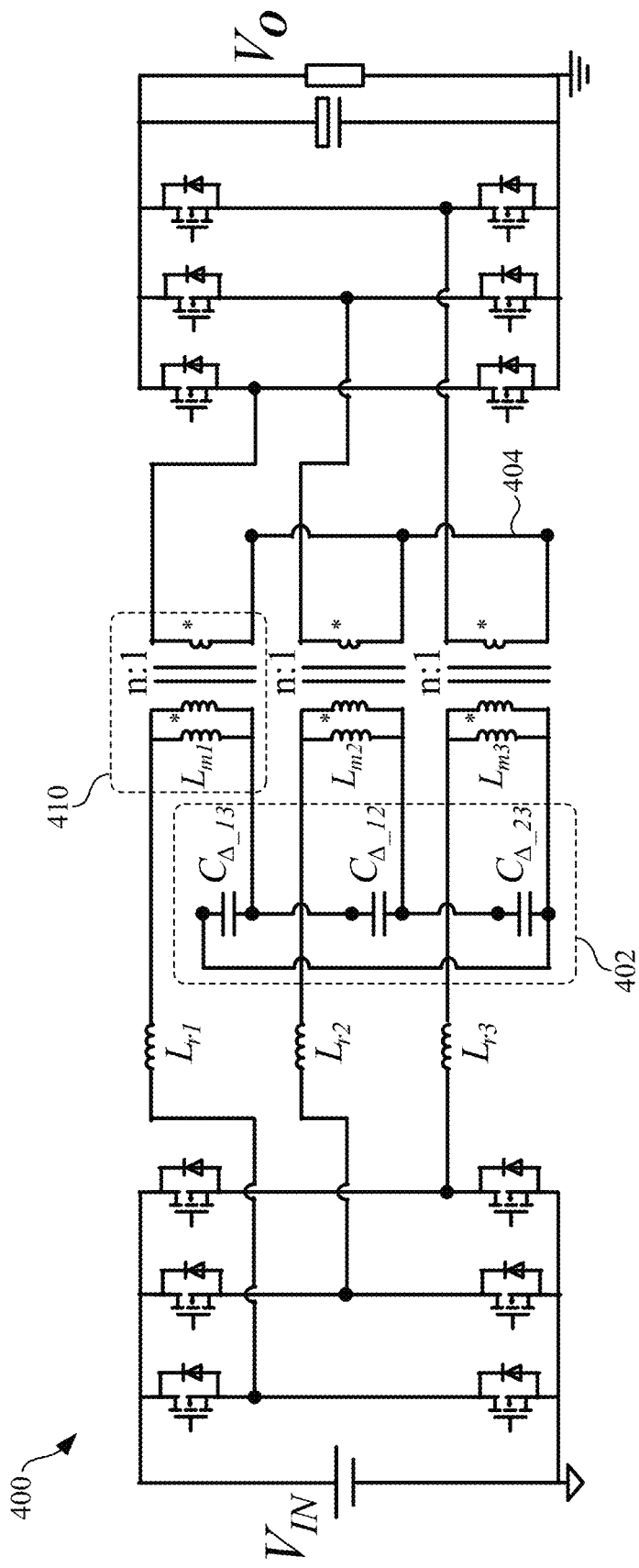
FIG. 4 illustrates a three-phase interleaved LLC converter with primary delta-connected resonant capacitors and a common secondary Y-node according to various embodiments described herein.

FIG. 4 illustrates a three-phase interleaved LLC converter 400 with delta-connected resonant capacitors 402 on the primary side and a common secondary Y-node 404 on the secondary side according to various embodiments described herein. The delta-connected resonant capacitors 402 couple the three phases of the converter 400 together on the primary side. The secondary side includes the common secondary Y-node 404.

Similar to the converters 100, 200, and 300, the primary phase legs in the converter 400 comprise resonant tank circuits (e.g., resonant capacitor networks, LC networks, LLC networks, etc.) used to transfer energy to the secondary side of the converter 400. For example, the first primary phase leg in the converter 400 includes a resonant tank circuit including the inductor $L_{r1}$, the inductor $L_{m1}$, and a combination of the capacitors $C_{A\_13}$ and $C_{A\_12}$. The inductor $L_{r1}$ is formed from the leakage inductance of the transformer 410, and the inductor $L_{m1}$ is formed from the magnetization inductance of the transformer 410. Similarly, the inductors $L_{r2}$ and $L_{r3}$ and the inductors $L_{m2}$ and $L_{m3}$ can be formed from the leakage and magnetization inductances of the transformers of the second and third phase legs of the converter 400. The inductors $L_{r1}$, $L_{r2}$, and $L_{r3}$ and the inductors $L_{m1}$, $L_{m2}$, and $L_{m3}$ can be integrated into one magnetic component similar to one or more of those shown in U.S. Patent Application Pub. No. 2016/0254756, the entire contents of which is hereby incorporated herein by reference.

Figure 5A:
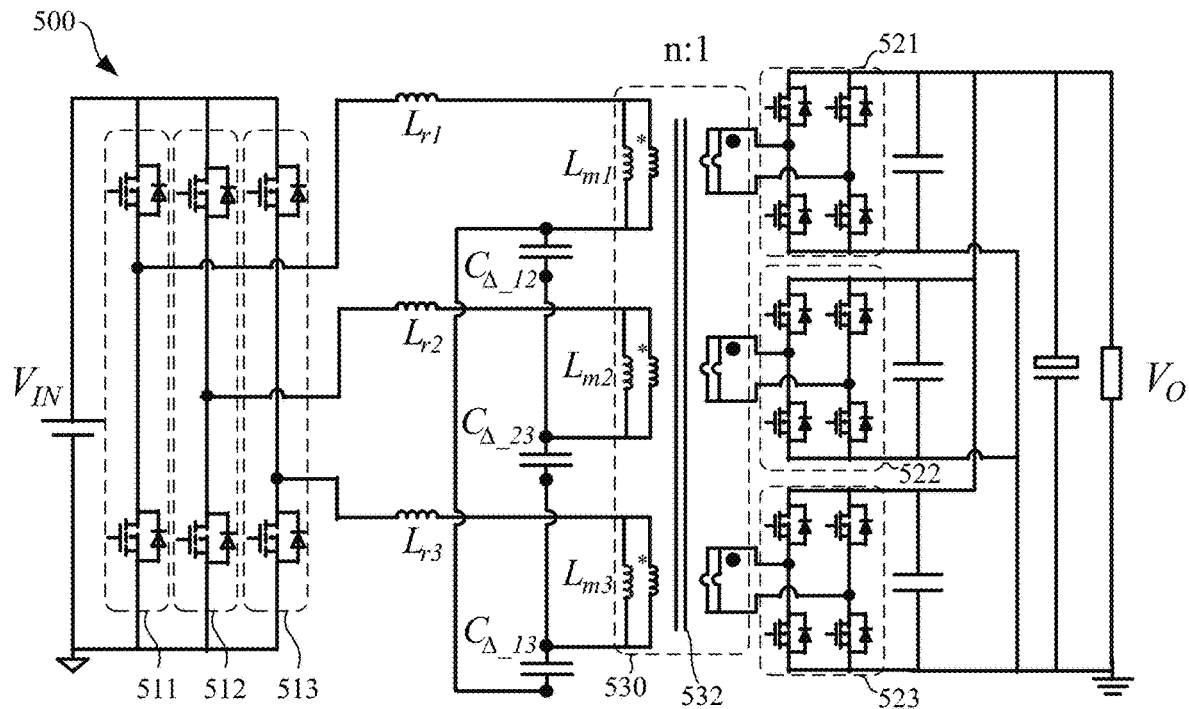
FIG. 5A illustrates a three-phase interleaved LLC converter with a delta-connected resonant capacitor network at the primary side and a full-bridge at the secondary side according to various embodiments described herein.

Turning to other configurations of LLC converters, FIG. 5A illustrates a three-phase interleaved LLC converter 500 with delta-connected resonant capacitor networks at the primary side and a full-bridge at the secondary side. The converter 500 in FIG. 5A is provided as a representative example. While the converter 500 includes three interleaved phases, additional (or fewer) phases can be interleaved in other examples. Further, the transformer 530 of the converter 500 can rely upon a turn ratio of n:1 as an example, but any suitable ratio can be relied upon.

As shown in FIG. 5A, the converter 500 includes three interleaved primary phase legs on a primary side of the converter 500. Each of the phase legs includes a primary-side resonant tank circuit. The resonant tank circuits of the phase legs on the primary side are electrically coupled to each other in a delta-connected resonant capacitor configuration. The secondary side is full-bridge configuration, and the outputs are taken in parallel. The secondary side includes a first full bridge 521, a second full bridge 522, and a third full bridge 523.

The first phase leg of the converter 500 is formed of the synchronous rectifiers 511 and a first primary resonant tank circuit. The first primary resonant tank circuit includes the inductor $L_{r1}$, the inductor $L_{m1}$, and a combination of the capacitors $C_{A\_13}$ and $C_{A\_12}$. The second phase leg is formed of the synchronous rectifiers 512 and a second primary resonant tank circuit. The second primary resonant tank circuit includes the inductor $L_{r2}$, the inductor $L_{m2}$, and a combination of the capacitors $C_{A\_12}$ and $C_{A\_23}$. The third phase leg is formed of the synchronous rectifiers 512 and a third primary resonant tank circuit. The third primary resonant tank circuit includes the inductor $L_{r3}$, the inductor $L_{m3}$, and a combination of the capacitors $C_{A\_13}$ and $C_{A\_23}$. The inductors $L_{r1}$, $L_{r2}$, and $L_{r3}$ can be embodied as the leakage inductances from the transformer 530 of converter 500. The inductors $L_{m1}$, $L_{m2}$, and $L_{m3}$ can be embodied as the magnetization inductances from the transformer 530 of converter 500. As shown in FIG. 5, the inductors $L_{r1}$, $L_{r2}$, and $L_{r3}$ and the inductors $L_{m1}$, $L_{m2}$, and $L_{m3}$ can be integrated together in the transformer 530 having a magnetic core 532.

Figure 5B:
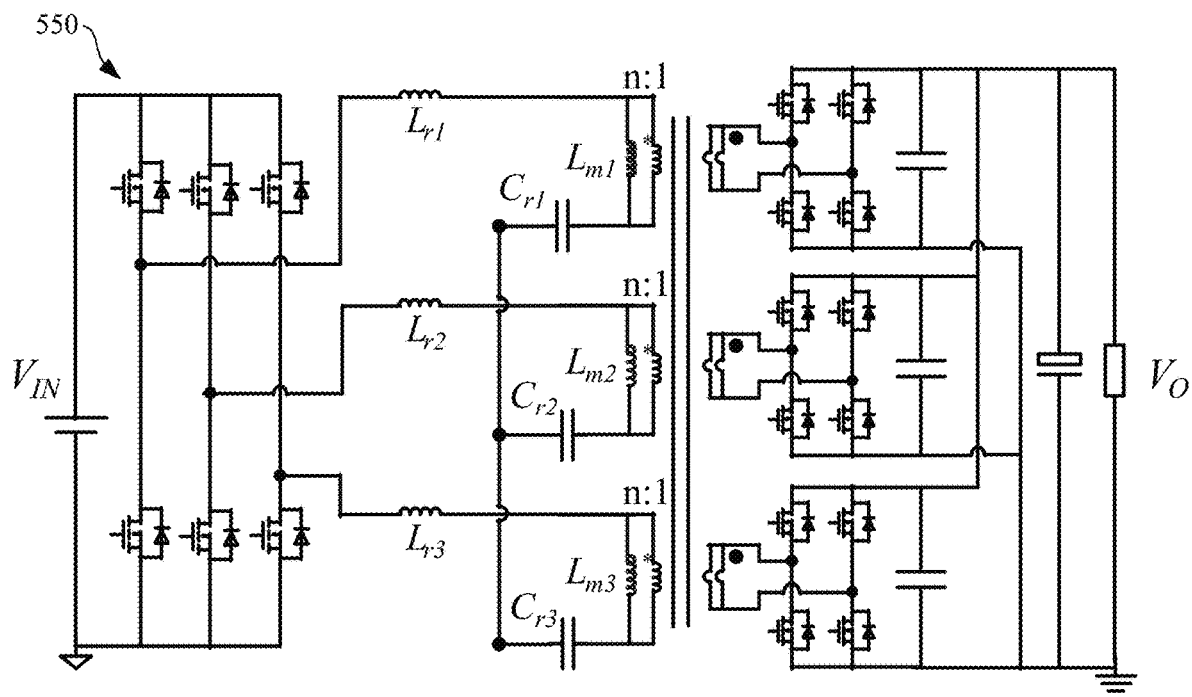
FIG. 5B illustrates a three-phase interleaved LLC converter with a common Y-node at the primary and a full-bridge at the secondary side according to various embodiments described herein.

As another example, FIG. 5B illustrates a three-phase interleaved LLC converter 550 with a common Y-node at the primary side and a full-bridge at the secondary side according to various embodiments described herein. The three-phase interleaved LLC converter 550 uses a common Y-node at primary side. The secondary side is full-bridge configuration, and the outputs are taken in parallel. The full-bridge configuration at the secondary side in both the converters 500 and 550 is more suitable for high frequency operation, because the currents in the secondary-side devices are half of that in the half-bridge configuration. Further, the AC current loop in the secondary side is minimized. The transformers in the converters 500 and 550 can be integrated into one magnetic component.

Figure 6A:
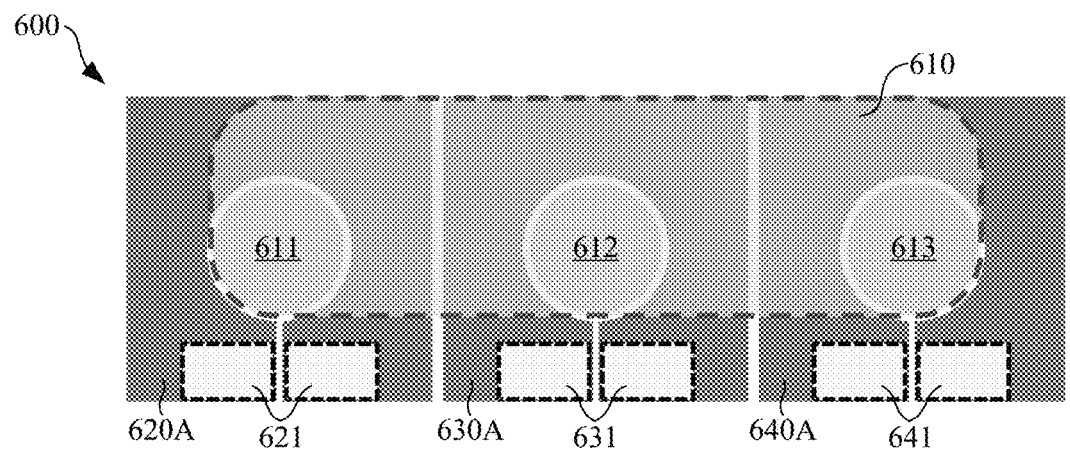
FIG. 6A illustrates a top view of an example transformer having round core legs from which a leakage inductance can be used as a resonant inductor according to various embodiments described herein.
Figure 6B:
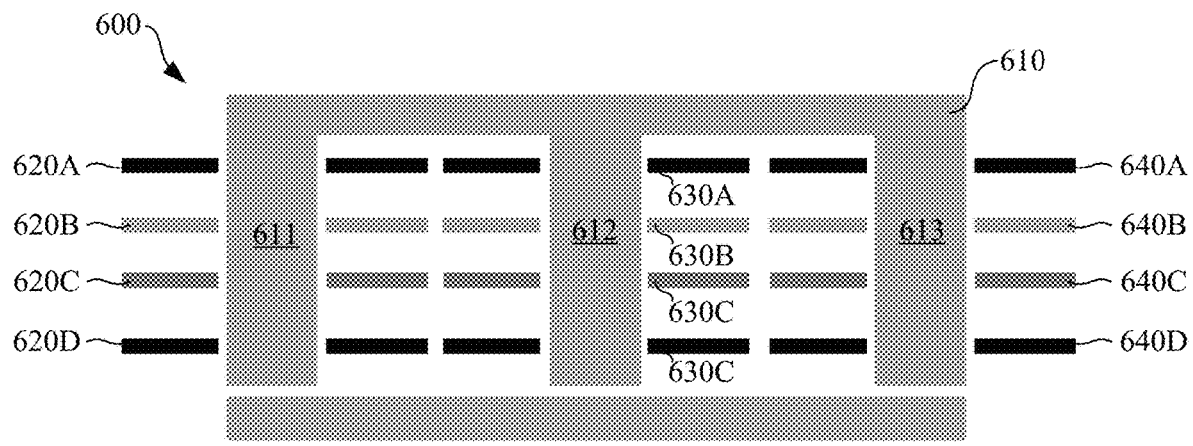
FIG. 6B illustrates a cross-section view of the example transformer shown in FIG. 6A according to various embodiments described herein.
Figure 6C:
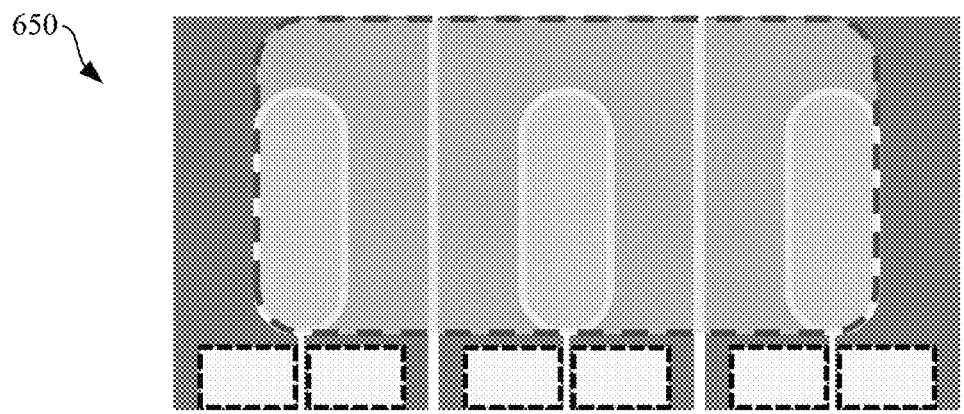
FIG. 6C illustrates a top view of an example transformer having elongated core legs according to various embodiments described herein.

FIG. 6A illustrates a top view of an example transformer 600 according to various embodiments described herein, and FIG. 6B illustrates a cross-section view of the example transformer 600. The transformers in the converters 500 and 550 shown in FIGS. 5A and 5B (and the converters 900 and 950 shown in FIGS. 9A and 9B) can be embodied, as one example, by the transformer 600. The transformer 600 includes a magnetic core 610 having three core legs 611-613. Each of the core legs 611-613 can be associated with one phase leg of a power converter, such as the power converters 500 and 550. The core legs 611-613 have a round or circular cross-sectional profile, although other cross-sectional profile shapes can be relied upon. For example, FIG. 6C illustrates a top view of an example transformer 650 having elongated core legs according to various embodiments described herein.

Referring between FIGS. 6A and 6B, the transformer 600 includes a number of primary-side and secondary-side windings that extend around the core legs 611-613. As best shown in FIG. 6B, the windings 620A-620D extend around the core leg 611, the windings 630A-630D extend around the core leg 612, and the windings 640A-640D extend around the core leg 613. In the example shown, the windings 620A and 620D serve as secondary-side windings, and the windings 620B and 620C serve as primary-side windings, although other arrangements are within the scope of the embodiments. The secondary windings 620A and 620D can include 2 turns (e.g., one turn in the winding 620A electrically coupled to one turn in the winding 620D) around the core leg 613, and the primary windings 620B and 620C can include 12 turns (e.g., six turns in the winding 620B electrically coupled to six turns in the winding 620C) around the core leg 613, for a primary to secondary turns ration of 6:1, as an example, although other turns ratios can be used. The windings 630A-630D and 640A-640D can include similar arrangements and turns of primary and secondary windings.

The windings 620A-620D, 630A-630D, and 640A-640D can be embodied as metal (e.g., copper) traces on a multi-layer printed circuit board (PCB) in one embodiment. In that case, the windings 620A, 630A, and 630A can be separated from the windings 620B, 630B, and 630B, and so on, by separating them from each other on different layers of the PCB, as shown in FIG. 6B. Connections between traces and layers in the PCB can be achieved through the use of plated vias in the PCB, for example, or other suitable means. Additionally, the top windings 620A, 630A, and 640A can also include bonding pads 621, 631, and 641, respectively, for direct electrical coupling to synchronous rectifiers, inductors, capacitors and other discrete and/or integrated components. The bottom windings 620D, 630D, and 640D can also include similar bonding pads.

There is some leakage inductance associated with the transformer 600. Particularly, there is leakage inductance, $L_{r1}$, associated with the windings 620A-620D and the core leg 611. There is also leakage inductance, $L_{r2}$, associated with the windings 630A-630D and the core leg 612, and leakage inductance, $L_{r3}$, associated with the windings 640A-640D and the core leg 613. Leakage inductance is a property of a transformer that causes the windings of the transformer to appear to have some pure inductance (i.e., leakage inductance) in series with the magnetization inductance of the mutually-coupled primary and secondary windings in the transformer. Leakage inductance is typically an undesirable property of transformers. According to aspects of the embodiments described herein, however, the leakage inductances of the transformer 600 can be relied, in part, for use in the resonant tank circuits of the interleaved phase legs in power converters. As described in further detail below, the leakage inductances in the transformer 600 (and other transformers described herein) can be primarily controlled or based on the design of the windings and the magnetic core used to form the transformer 600. In the transformer 600, the leakage inductances, $L_{r1}$, $L_{r2}$, and $L_{r3}$ are relatively small and relatively difficult to control or determine.

Figure 7:
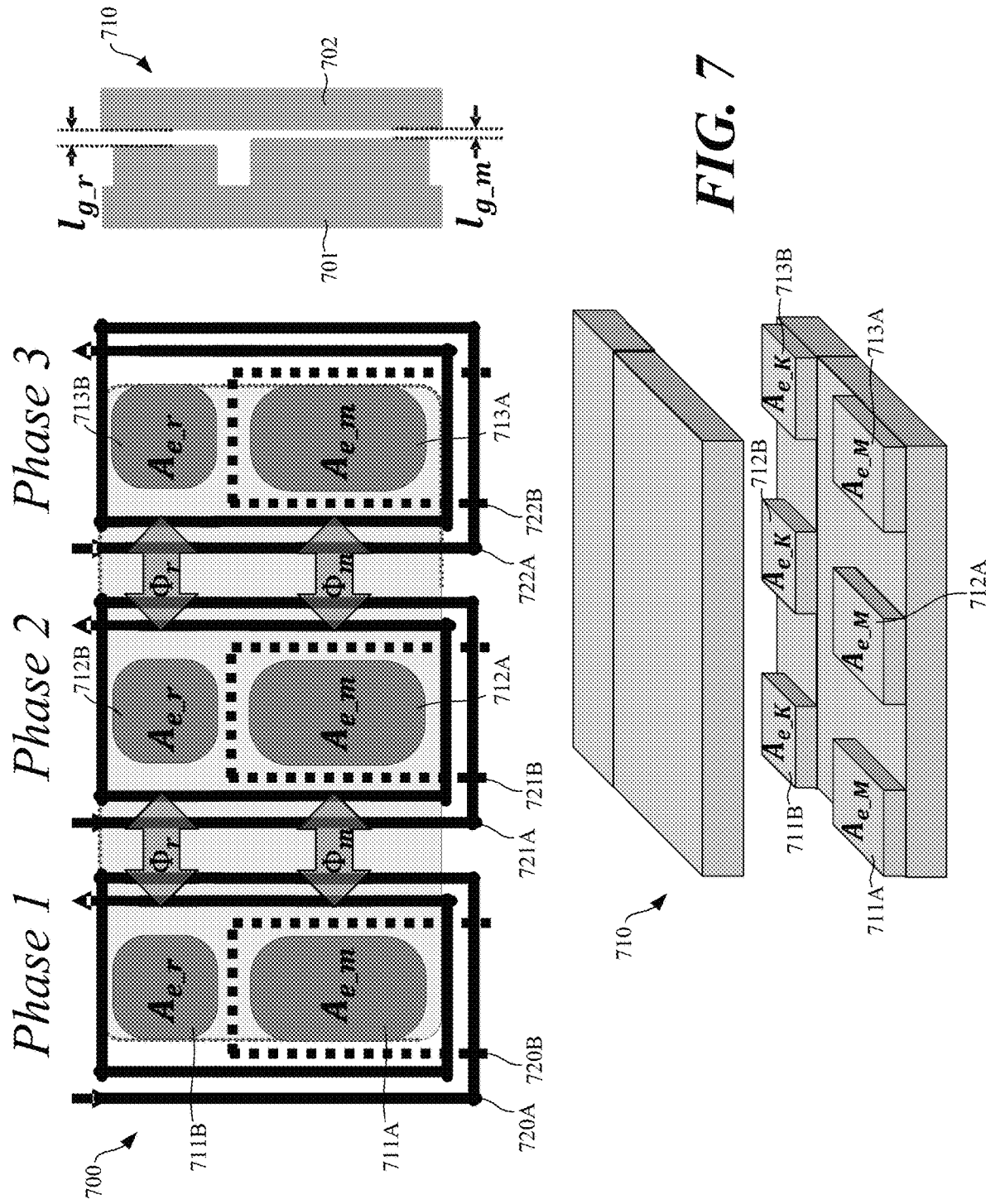
FIG. 7 illustrates a simplified wiring diagram for an example transformer, a cross-sectional view of the core of the transformer, and a three-dimensional view of the core of the transformer according to various embodiments described herein.

Other transformer structures can be relied upon to create larger, more tailored leakage inductances. FIG. 7 illustrates a simplified wiring diagram for an example transformer 700, a cross-sectional view of the core 710 of the transformer 700, and a three-dimensional view of the core 710 of the transformer 700 according to various embodiments described herein. The transformers in the converters 500 and 550 shown in FIGS. 5A and 5B (and the converters 900 and 950 shown in FIGS. 9A and 9B), among others, can be embodied by the transformer 700. The leakage inductances of the transformer 700 can be larger than those of the transformer 600, for example, based on the design factors described below. The leakage inductances can also be controlled or determined based on the design factors described below.

The transformer 700 includes windings and core legs for three phases of a power converter. In FIG. 7, the primary winding 720A and the secondary winding 720B are windings for the first phase of the power converter. Further, the primary winding 721A and the secondary winding 721B are windings for the second phase of the power converter, and the primary winding 722A and the secondary winding 722B are windings for the third phase of the power converter.

The core 710 includes two core legs for each phase of the power converter. In FIG. 7, the core leg 711A and the core leg 711B are two core legs for the first phase of the power converter. The core leg 712A and the core leg 712B are two core legs for the second phase of the power converter, and the core leg 713A and the core leg 713B are two core legs for the third phase of the power converter. Thus, the core 710 includes six core legs in total.

The portion of the primary winding 720A that extends around the core leg 711B contributes to the leakage inductance for the first phase leg of the transformer 700. This leakage inductance can be used as part of a resonant tank circuit for a phase leg of a power converter. For example, this leakage inductance can be relied upon as the inductor $L_{r1}$ in the first phase leg of the converter 500 shown in FIG. 5A, the converter 550 shown in FIG. 5A, and other power converters. Similarly, the portion of the primary winding 721A that extends around the core leg 712B contributes to the leakage inductance for the second phase leg of the transformer 700. This leakage inductance can be relied upon as the inductor $L_{r2}$, for example, in the second phase leg of the converter 500 shown in FIG. 5A, the converter 550 shown in FIG. 5A, and other power converters. Additionally, the portion of the primary winding 722A that extends around the core leg 713B contributes to the leakage inductance for the third phase leg of the transformer 700. This leakage inductance can be relied upon as the inductor $L_{r3}$, for example, in the third phase leg of the converter 500 shown in FIG. 5A, the converter 550 shown in FIG. 5A, and other power converters.

When the transformer 700 is relied upon in a power converter, the transformer 700 forms three resonant inductors (e.g., the leakage inductances formed from the primary windings 720A-722A around the core legs 711B-713B) and three transformers (formed from the primary windings 720A-722A, the secondary windings 720B-722B, and the core legs 711A-713A). Air gaps $l_{g\_r}$ exist between the core legs 711B-713B of the core section 701 and the core section 702. Air gaps $l_{g\_m}$ also exist between the core legs 711A-713A of the core section 701 and the core section 702. The leakage inductances $L_{r1}$, $L_{r2}$, and $L_{r3}$ of the transformer 700 can be controlled or determined based on the cross-sectional areas (i.e., $A_{e\_r}$) of the core legs 711B-713B and the size of the air gap $l_g$ r. The magnetizing inductances $L_{m1}$, $L_{m2}$, and $L_{m3}$ of the transformer 700 can be controlled or determined based on the cross-sectional areas (i.e., $A_{e\_m}$) of the core legs 711A-713A and the size of the air gap $l_{g\_m}$ according to the following expression:

$$L_N = \frac{L_m}{L_r} = \frac{A_{e\_m}/l_{g\_m}}{A_{e\_r}/l_{g\_r}}$$

Figure 8:
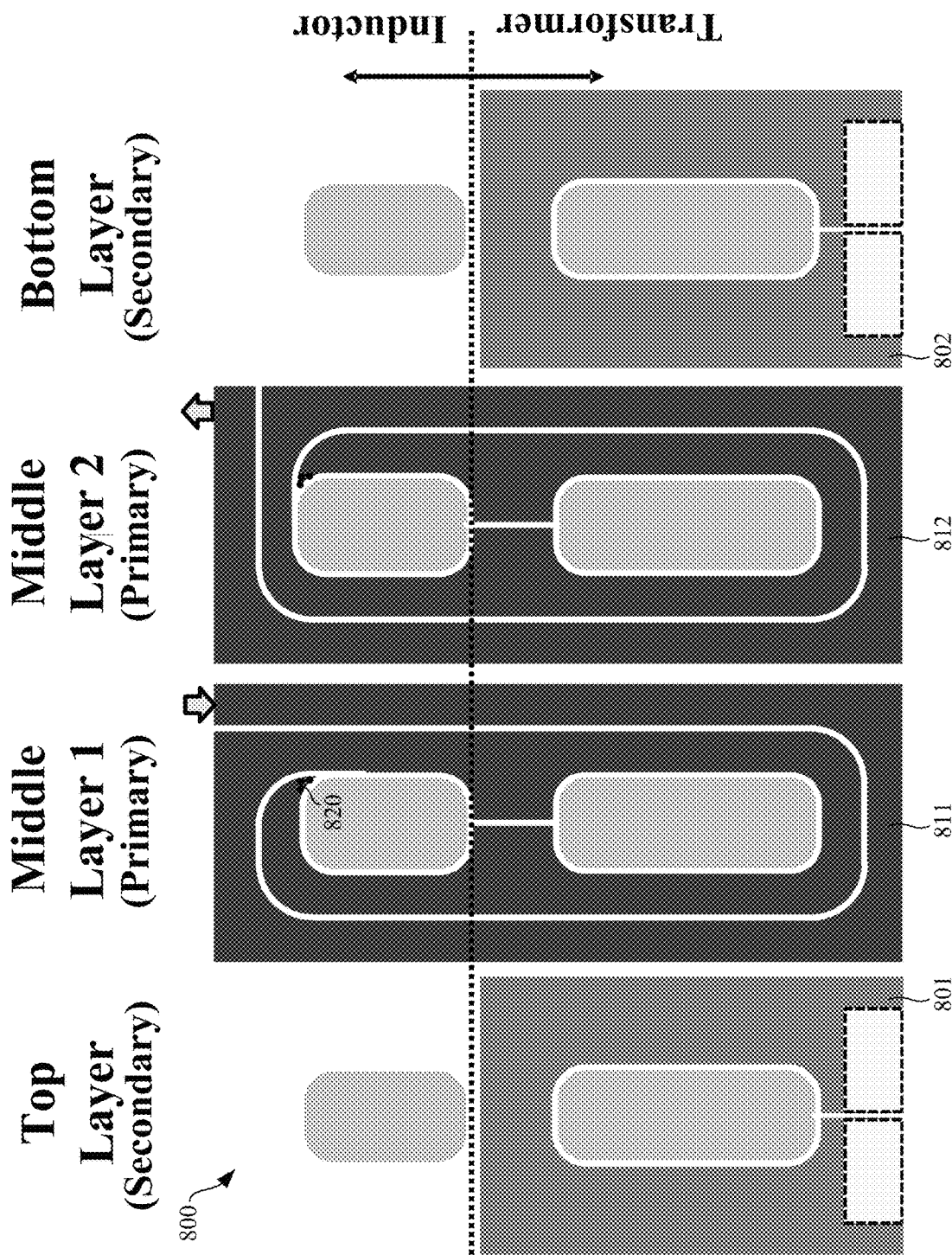
FIG. 8 illustrates an example printed circuit board winding implementation for the transformer shown in FIG. 7 according to various embodiments described herein.

The windings of the transformer 700 can be implemented using a number of layers in a PCB, such as the 4-layer PCB winding 800 shown in FIG. 8. The 4-layer PCB winding 800 shown in FIG. 8 can be used for one phase leg of the transformer 700 shown in FIG. 7. The top layer 801 and the bottom layer 802 can be coupled in parallel to form one turn of the secondary winding 720B shown in FIG. 7. The middle layers 811 and 812 can be electrically coupled together through the vias 820 to form four turns of the primary winding 720A. In other examples, PCB windings with more layers can be used to reduce winding conduction loss.

Figure 9A:
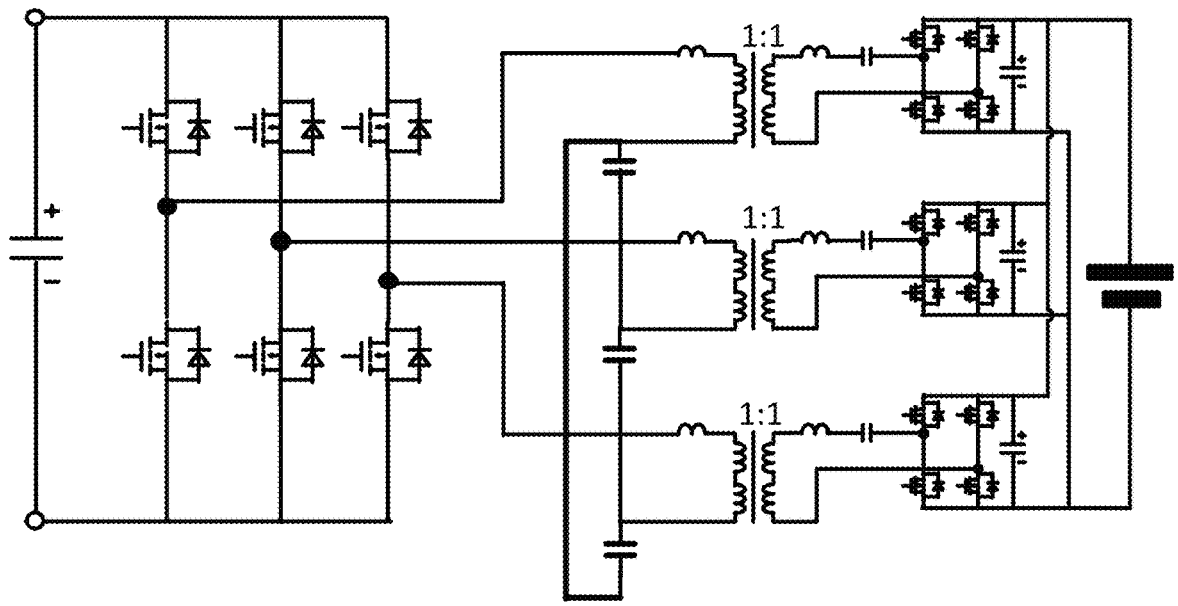
FIG. 9A illustrates an example three-phase interleaved CLLC converter with delta-connected primary resonant capacitors and full-bridge secondary according to various embodiments described herein.
Figure 9B:
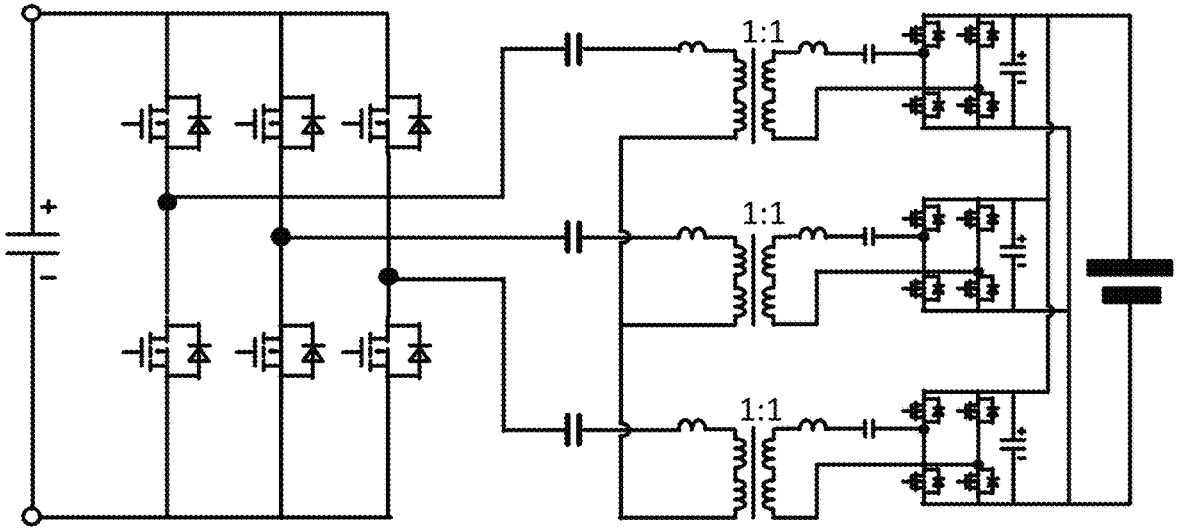
FIG. 9B illustrates an example three-phase interleaved CLLC converter with a common primary Y-node and full-bridge secondary according to various embodiments described herein.

Turning to other embodiments, FIG. 9A illustrates an example three-phase interleaved CLLC converter 900 with delta-connected primary resonant capacitors and full-bridge secondary according to various embodiments described herein. FIG. 9B illustrates an example three-phase interleaved CLLC converter 950 with a common primary Y-node and full-bridge secondary according to various embodiments described herein.

Figure 10A:
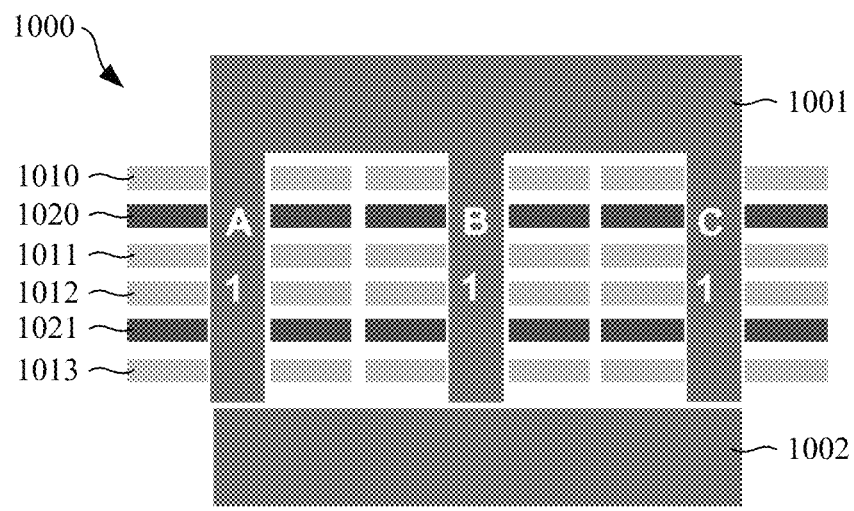
FIG. 10A illustrates a front cross-section view of a proposed transformer according to various embodiments described herein.
Figure 10B:
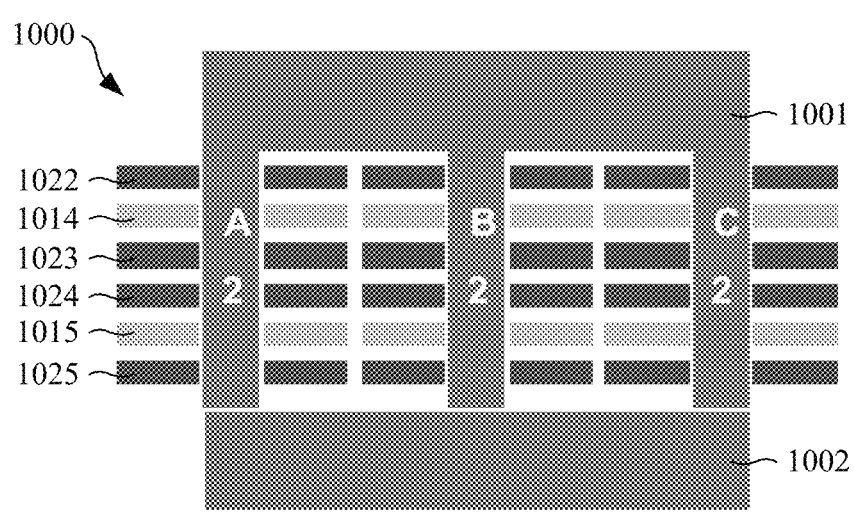
FIG. 10B illustrates a back cross-section view of the proposed transformer shown in FIG. 10A according to various embodiments described herein.

FIG. 10A illustrates a front cross-section view of a proposed transformer 1000, and FIG. 10B illustrates a back front cross-section view of the transformer 1000 shown in FIG. 10A. Resonant inductors on both the primary and secondary sides of the example converter 900 shown in FIG. 9A and the example converter 950 shown in FIG. 9B can be realized using the transformer 1000.

As shown in FIGS. 10A and 10B, the transformer 1000 includes a top core section 1001, a bottom core section 1002, and a number of windings. The transformer 1000 includes core legs A1 and A2 for a first phase leg of a power converter, core legs B1 and B2 for a second phase leg of the power converter, and core legs C1 and C2 for a third phase leg of the power converter. Primary and secondary windings are wound around the core legs A1 and A2, although the distribution of the primary and secondary windings is uneven between the core legs A1 and A2. Similarly, primary and secondary windings are wound around the core legs B1 and B2, although the distribution of the windings is uneven between them. Primary and secondary windings are also wound around the core legs C1 and C2, although the distribution of the windings is uneven between them.

For the first phase leg, four primary PCB windings 1010-1013 are wound around the core leg A1, but only two secondary PCB windings 1020 and 1021 are wound around the core leg A1. Further, two primary PCB windings 1014 and 1015 are wound around the core leg A2, and four secondary PCB windings 1022 and 1025 are wound around the core leg A2, for turns ratio of 6:6 among the core legs A1 and A2. This uneven distribution of primary and secondary windings between the core legs A1 and A2 is the same around the core legs B1 and B2 for the second phase leg and the core legs C1 and C2 for the third phase leg.

Figure 11:
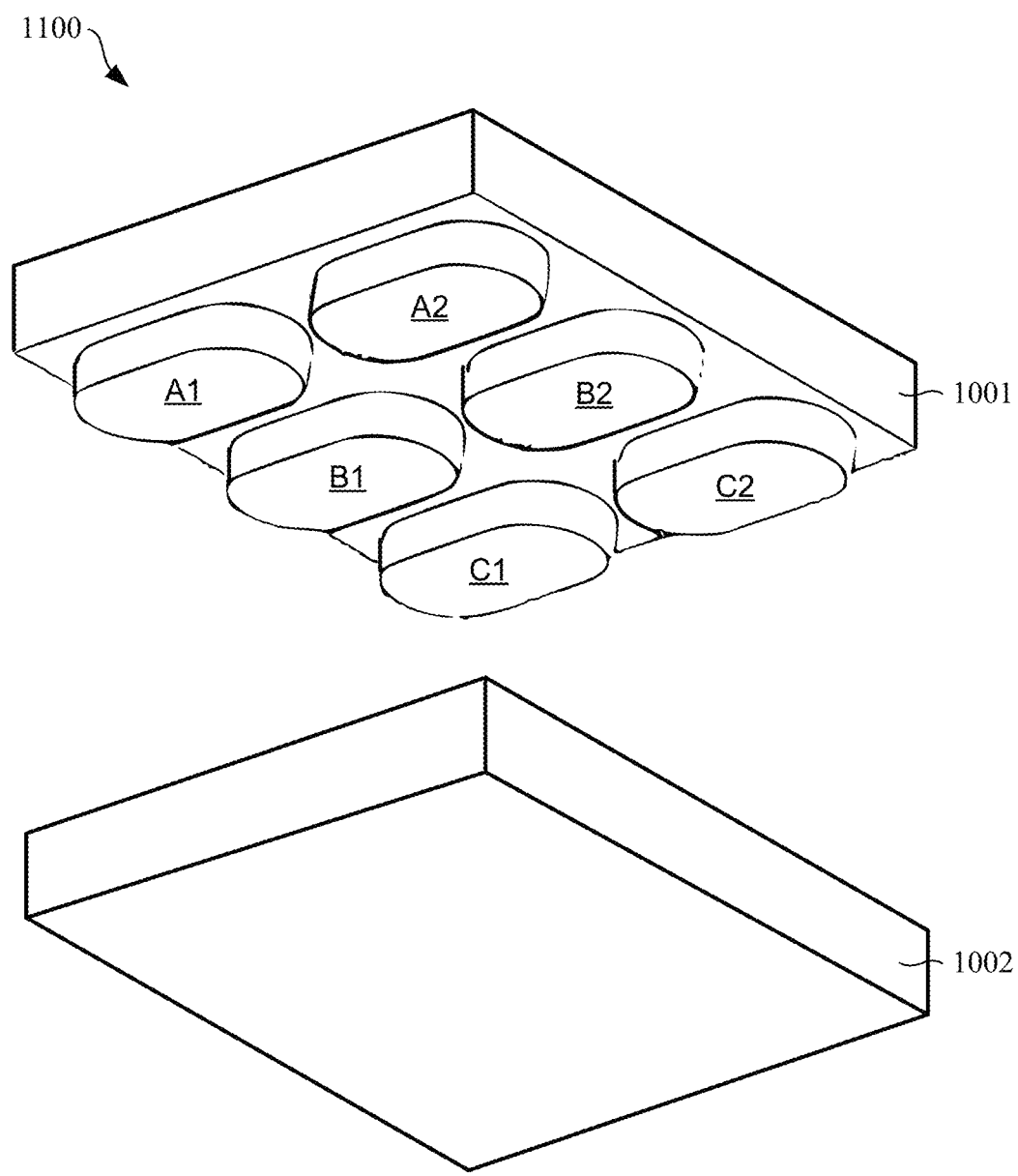
FIG. 11 illustrates a three-dimensional view of the top core section and the bottom core section of the magnetic core of the transformer shown in FIGS. 10A and 10B according to various embodiments described herein.

FIG. 11 illustrates a three-dimensional view of the top core section 1001 and the bottom core section 1002 of the magnetic core of the transformer 1000 shown in FIGS. 10A and 10B. The core legs A1, A2, B1, B2, C1, and C2 are shown as being rectangular with rounded corners or ends in FIG. 11, but the core legs A1, A2, B1, B2, C1, and C2 can be formed in any suitable shape. In the embodiment shown in FIG. 11, the top core section 1001 is formed as a single piece, and the bottom core section 1002 is formed as a single piece. Both the top core section 1001 and the bottom core section 1002 can be formed from any suitable material or materials.

Figure 12:
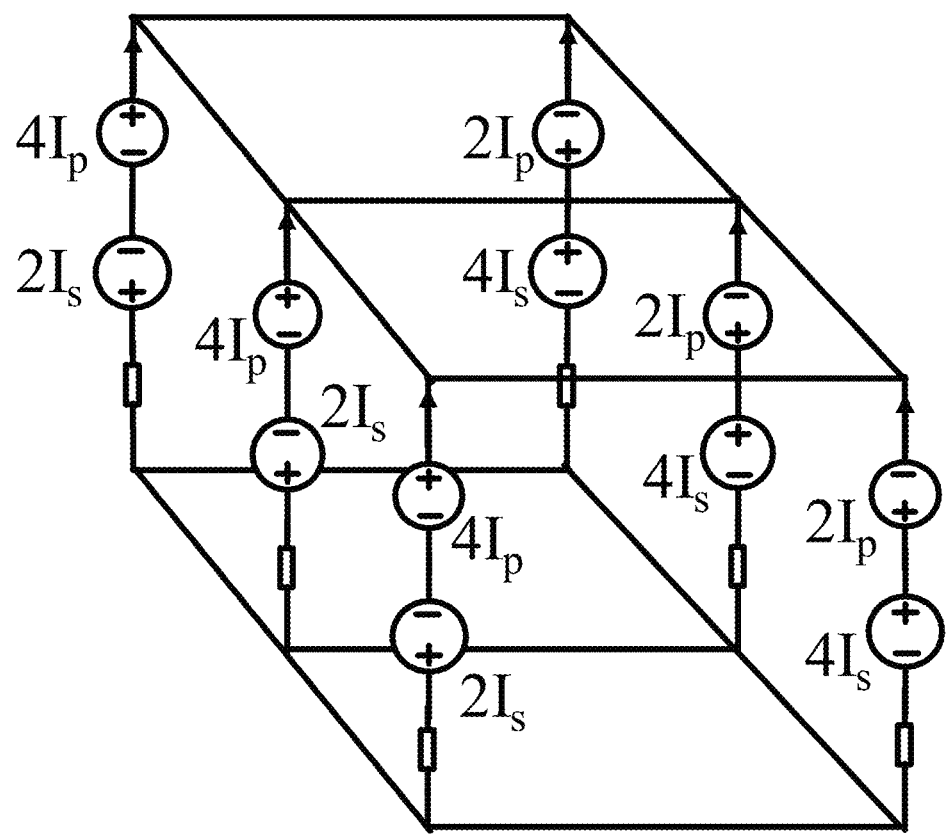
FIG. 12 illustrates a reluctance model of the transformer shown in FIGS. 10A and 10B according to various embodiments described herein.
Figure 13:
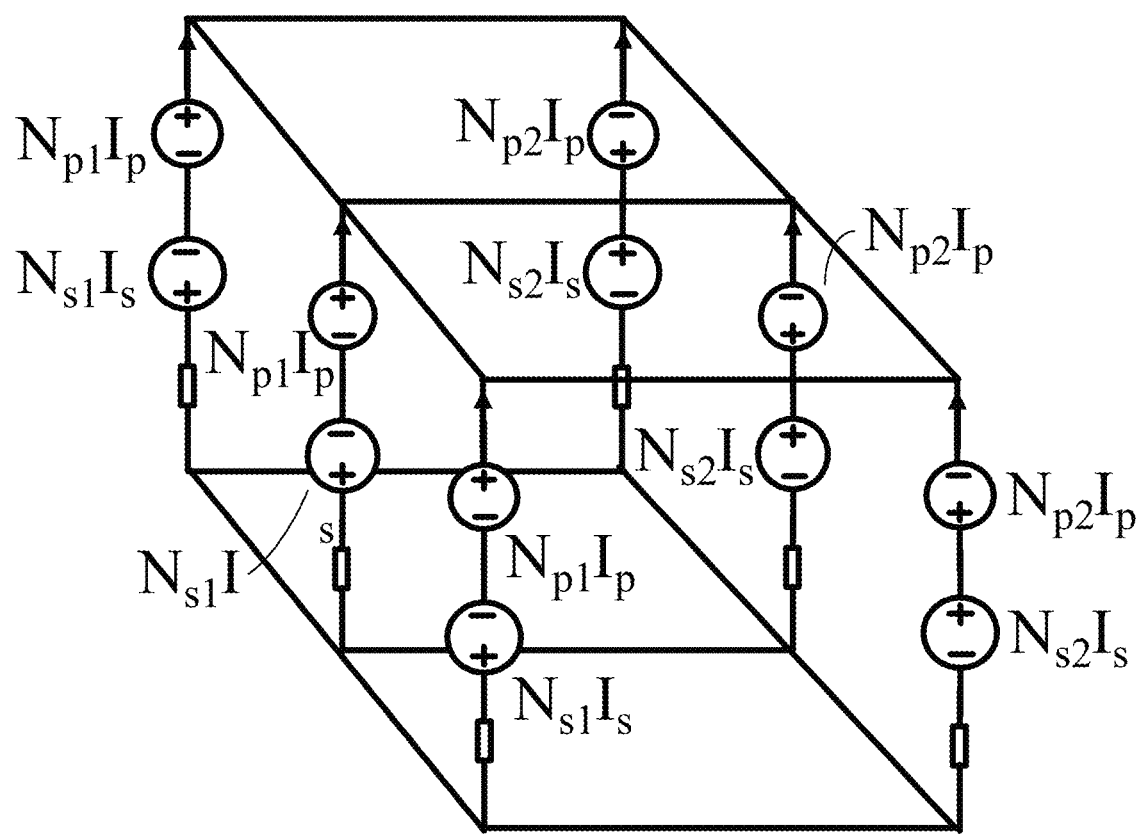
FIG. 13 illustrates a generalized reluctance model of the transformer shown in FIGS. 10A and 10B according to various embodiments described herein.

The reluctance model of the transformer 1000 is shown in FIG. 12. With this reluctance model, the transformer equivalent magnetizing inductance and leakage inductance can be calculated for each phase, as follows:

$$L_m = \frac{16}{R_g}, \text{ and}$$

$$L_k = \frac{4}{R_g}.$$

The magnetic structure shown in FIGS. 10A, 10B, and 11 is not limited to 6:6 turns ratio, however. For other turns ratios, a more generalized reluctance model is shown in Error! Reference source not found. For the generalized reluctance model, the turns ratio in each phase is Np1+Np2: Ns1+Ns2. Np1 and Ns1 are the number of primary windings and secondary windings on A1, respectively, while Np2 and Ns2 are the number of primary windings and secondary windings on A2, respectively. With this generalized model, the transformer equivalent magnetizing inductance and leakage inductance can be calculated for each phase, as follows:

$$L_m = \frac{4N_{p1}N_{p2}}{2R_{g1}}, \text{ and}$$

$$L_k = \frac{(N_{p1} - N_{p2})^2}{R_{g1}}.$$

Figure 14:
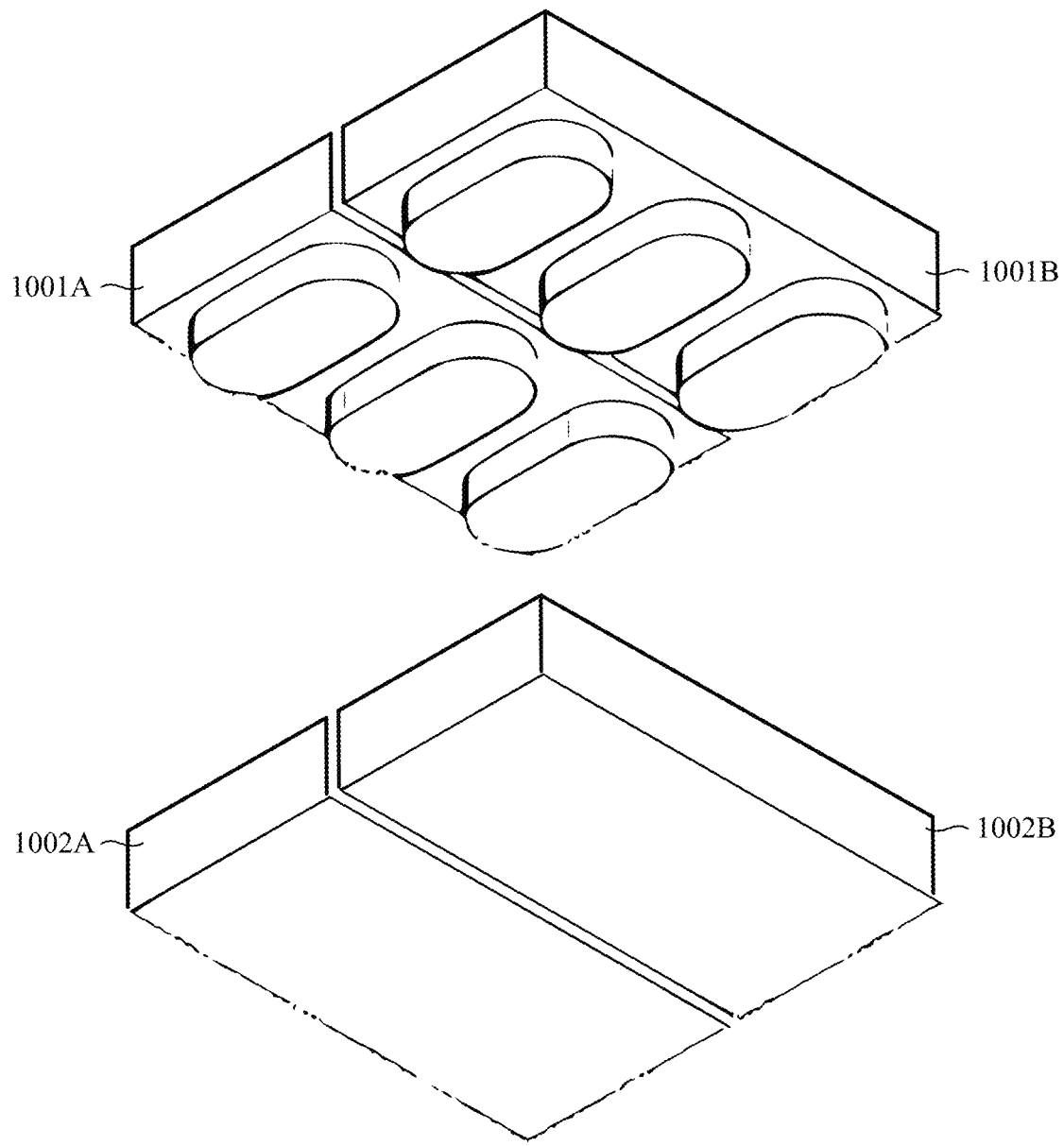
FIG. 14 illustrates a three-dimensional view of magnetic core sections for another transformer according to various embodiments described herein.

The magnetic structure shown in FIGS. 10A, 10B, and 11 can also be realized in another way. Instead of using one core with six core legs, two separate cores can be used with three core legs each core, as shown in FIG. 14. As shown in FIG. 14, a magnetic core 1100 includes two separate top core sections, 1001A and 1001B. The magnetic core 1100 also includes two separate bottom core sections, 1002A and 1002B.

Figure 15:
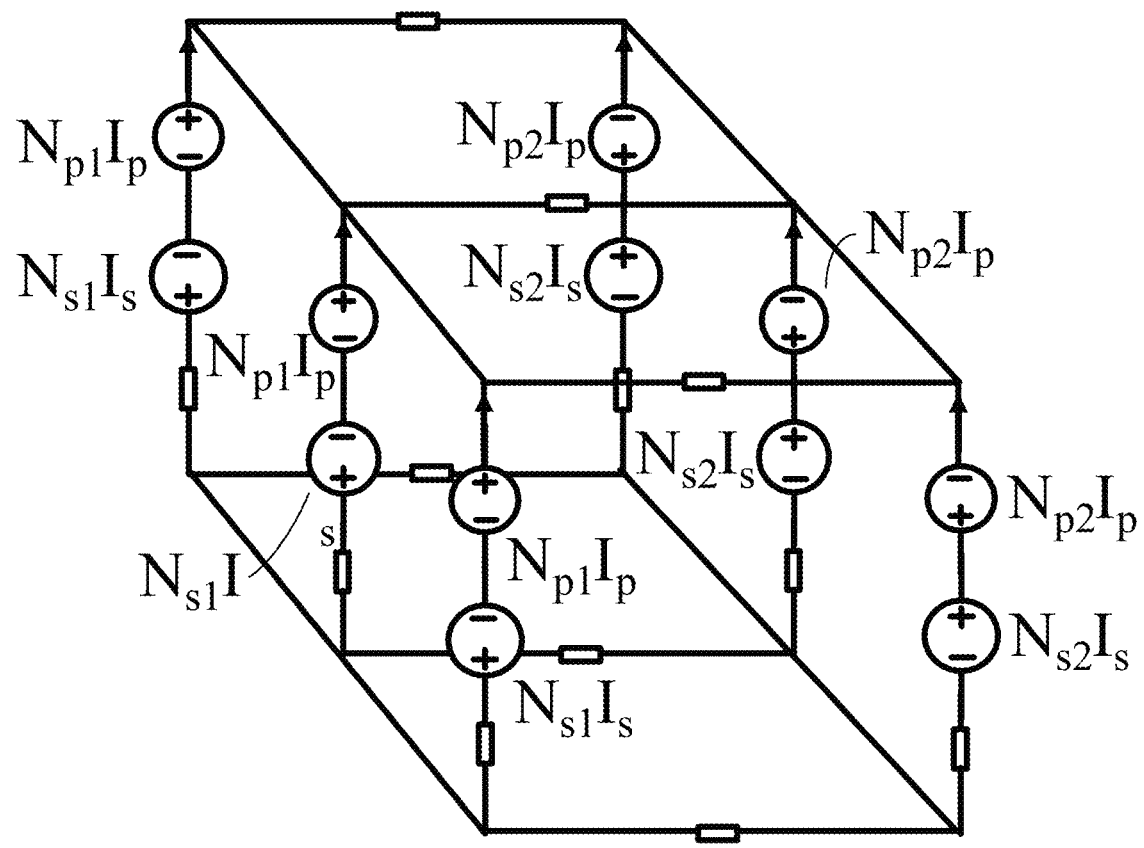
FIG. 15 illustrates a reluctance model for a transformer including the magnetic core shown in FIG. 14 according to various embodiments described herein.

The corresponding reluctance model for a transformer including the magnetic core 1100 is shown in FIG. 15. From the reluctance model, the transformer equivalent magnetizing inductance and leakage inductance can be calculated for each phase, as follows:

$$L_m = \frac{4N_{p1}N_{p2}}{2R_{g1}}, \text{ and}$$

$$L_k = \frac{(N_{p1} - N_{p2})^2}{R_{g1}}.$$

The interleaved LLC converters described herein can be extended to interleaved LLC converter with any odd number of phases. The proposed magnetic structures shown in FIGS. 6A, 6B, 6C, 7, 8, 10A, 10B, 11, and 14 can be extended to use with any number of layers of PCB windings.

The embodiments described herein include new three-phase interleaved LLC and CLLC resonant converters with integrated magnetic structures. Certain features and advantages include primary side coupling of different phases of LLC or CLLC converters through a delta-connected resonant capacitor network or a common Y-node to achieve automatic current sharing. In some cases, the secondary side can rely upon a full-bridge configuration, and the outputs of different phases on the secondary side can be connected in parallel to minimize the AC current loop.

In the magnetic structures, the transformers for three phases of a power converter, for example, can be integrated into one magnetic core with three core legs, and the leakage inductances of each core leg can be used as resonant inductors for the three phases of the power converter. In another example, three inductors and three transformers can be integrated into one magnetic core with six core legs, and the resonant inductances and magnetizing inductances can be controlled independently. In another example, six inductors and three transformers can be integrated into one magnetic core with six core legs. The resonant inductances and magnetizing inductances can be controlled by adjusting the air gap. Their ratio can be changed by changing the primary and secondary winding distributions. In still another example, six inductors and three transformers can be integrated into two magnetic cores with three core legs for each core. The resonant inductance and magnetizing inductance can be controlled by adjusting the air gap. Their ratio can be changed by changing the primary and secondary winding distribution. A multi-layer PCB winding can be employed in any of the transformers described herein, and synchronous rectifiers can be integrated as part of the windings.

The above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

Therefore, the following is claimed:

1. A power converter, comprising:
   a plurality of interleaved primary phase legs on a primary side of the power converter, the plurality of interleaved primary phase legs comprising a plurality of primary resonant tank circuits;
   a plurality of interleaved secondary phase legs on a secondary side of the power converter; and
   a transformer between the primary side and the secondary side of the power converter, the transformer comprising a magnetic core having a plurality of core legs, wherein:
   a primary winding of one of the plurality of interleaved primary phase legs extends around a first core leg of the transformer and extends around a second core leg of the transformer;
   a secondary winding of one of the plurality of interleaved secondary phase legs extends around the first core leg and extends around the second core leg; and
   a first ratio of turns of the primary winding around the first core leg to the secondary winding around the first core leg is different than a second ratio of turns of the primary winding around the second core leg to the secondary winding around the second core leg.

2. The power converter of claim 1, wherein the plurality of primary resonant tank circuits are electrically coupled in at least one of a delta-connected configuration or in a common Y-node configuration.

3. The power converter of claim 1, wherein each secondary phase leg among the plurality of interleaved secondary phase legs comprises a full-bridge configuration of synchronous rectifiers.

4. The power converter of claim 1, wherein the magnetic core of the transformer comprises at least two core legs for each of the plurality of interleaved primary phase legs of the power converter.

5. The power converter of claim 4, wherein:
   a leakage inductance of the transformer is based on a cross-sectional area of and an air gap of at least one of the first core leg and the second core leg; and
   a magnetization inductance of the transformer is based on the cross-sectional area of and the air gap of the at least one of the first core leg and the second core leg.

6. The power converter of claim 5, wherein:
   the power converter comprises three interleaved primary phase legs, each comprising a primary resonant tank circuit; and
   the transformer contributes a leakage inductance for each primary resonant tank circuit of the three interleaved primary phase legs.

7. The power converter of claim 1, wherein the plurality of interleaved secondary phase legs comprise a plurality of secondary resonant tank circuits for bidirectional power transfer using the power converter.

8. The power converter of claim 7, wherein the transformer forms magnetization inductances for power transfer between the primary side and the secondary side of the power converter, primary leakage inductances for the primary resonant tank circuits, and secondary leakage inductances for the secondary resonant tank circuits.

9. The power converter of claim 8, wherein the magnetization inductances, the primary leakage inductances, and the secondary leakage inductances are based on an air gap of the plurality of core legs of the magnetic core of the transformer.

10. The power converter of claim 1, wherein a size of a first air gap of the first core leg is different than a size of a second air gap of the second core leg.

11. The power converter of claim 1, wherein the transformer comprises one magnetic core having six core legs.

12. The power converter of claim 1, wherein the transformer comprises two magnetic cores having three core legs each.

13. The power converter of claim 1, wherein the primary winding and the secondary winding are formed on one or more printed circuit boards.

14. The power converter of claim 13, wherein at least one synchronous rectifier of the power converter is electrically coupled to at least one of the one or more printed circuit boards.

15. A power converter, comprising:
- a plurality of interleaved primary phase legs on a primary side of the power converter, the plurality of interleaved primary phase legs comprising a plurality of primary resonant tank circuits;
- a plurality of interleaved secondary phase legs on a secondary side of the power converter; and
- a transformer between the primary side and the secondary side of the power converter, the transformer comprising a magnetic core having a plurality of core legs, wherein:
- a primary winding of one of the plurality of interleaved primary phase legs extends around a first core leg of the transformer and extends around a second core leg of the transformer;
- a secondary winding of one of the plurality of interleaved secondary phase legs extends around the first core leg and extends around the second core leg;
- a first ratio of turns of the primary winding around the first core leg to the secondary winding around the first core leg is different than a second ratio of turns of the primary winding around the second core leg to the secondary winding around the second core leg; and
- the plurality of primary resonant tank circuits are electrically coupled in at least one of a delta-connected configuration or in a common Y-node configuration.

16. The power converter of claim 15, wherein the magnetic core of the transformer comprises at least two core legs for each of the plurality of interleaved primary phase legs of the power converter.

17. The power converter of claim 16, wherein:
- a leakage inductance of the transformer is based on a cross-sectional area of and an air gap of at least one of the first core leg and the second core leg; and
- a magnetization inductance of the transformer is based on the cross-sectional area of and the air gap of the at least one of the first core leg and the second core leg.

18. The power converter of claim 15, wherein the plurality of interleaved secondary phase legs comprise a plurality of secondary resonant tank circuits for bidirectional power transfer using the power converter.

19. The power converter of claim 18, wherein the transformer forms magnetization inductances for power transfer between the primary side and the secondary side of the power converter, primary leakage inductances for the primary resonant tank circuits, and secondary leakage inductances for the secondary resonant tank circuits.

20. The power converter of claim 19, wherein the magnetization inductances, the primary leakage inductances, and the secondary leakage inductances are based on an air gap of the plurality of core legs of the magnetic core of the transformer.

* * * * *